(12) United States Patent
Lai et al.

(10) Patent No.: US 7,704,287 B2
(45) Date of Patent: Apr. 27, 2010

(54) REACTIVE RED DYE COMPOSITION AND APPLICATION THEREOF

(75) Inventors: Bao-Kun Lai, Taoyuan Hsien (TW); Huei-Chin Huang, Taoyuan Hsien (TW); Cheng-Hsiang Hsu, Taoyuan Hsien (TW); Ya-Chi Tseng, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 161 days.

(21) Appl. No.: 11/802,288

(22) Filed: May 22, 2007

(65) Prior Publication Data

US 2008/0127433 A1    Jun. 5, 2008

(30) Foreign Application Priority Data

Dec. 5, 2006    (CN) .................. 2006 1 0162118

(51) Int. Cl.
*C09B 67/24*    (2006.01)
(52) U.S. Cl. .................. 8/641; 8/669; 8/673; 8/681; 8/687
(58) Field of Classification Search .................. 8/641, 8/669, 673, 681, 687
See application file for complete search history.

(56) References Cited

FOREIGN PATENT DOCUMENTS

WO    WO 2007/039573 A2 *    4/2007

OTHER PUBLICATIONS

STIC Search Report dated Jan. 26, 2009.*

* cited by examiner

*Primary Examiner*—Eisa B Elhilo
(74) *Attorney, Agent, or Firm*—Bacon & Thomas, PLLC

(57) ABSTRACT

The present invention provides a reactive red dye composition comprising (A) 3% to 97% by weight of a reactive azo dye of the following formula (I), $$D_1-N=N-\underset{HO_3S}{\overset{OH}{\text{naphthalene}}}-NHW, \quad N=N-D_2 \tag{I}$$

wherein W, $D_1$ and $D_2$ are defined the same as the specification; and (B) 97% to 3% by weight of a reactive azo dye of the following formula (II), $$\underset{ZHN}{\overset{R}{\underset{N=N-D_4}{\text{benzene}}}}\underset{NH_2}{N=N-D_3} \tag{II}$$

wherein R, X, Z, $D_3$ and $D_4$ are defined the same as the specification. The reactive red dye composition of the present invention can be utilized to dye cellulose fibers. The cellulose fibers dyed by the reactive red dye composition obtain not only good build-up and level dyeing properties but also an excellent property of white discharging.

14 Claims, No Drawings

REACTIVE RED DYE COMPOSITION AND APPLICATION THEREOF

BACKGROUND OF THE INVENTION

1. Field of the Invention

The present invention relates to a reactive red dye composition, and particularly relates to a reactive red dye composition suitable for discharge printing.

2. Description of the Related Prior Art

Regarding the dye of fabrics, there has not been any methods existed to obtain a red dye product with good build up by a single reactive dye till this day. The only method to obtain a red dye product with good build up is by mixing different colors.

In order to obtain a reactive red dye composition with good build up, a reactive dye of the following formula (1) is generally taken as a base and then mixed with orange, yellow or other colors of reactive dyes.

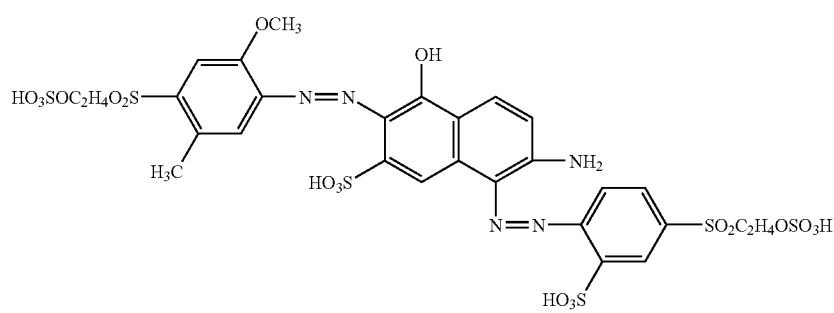

(1)

The similar technology of such a color mixing dye was disclosed in several patents, such as Chinese Patents Nos. CN1524904, CN1730565, and CN1730566, PCT Patent Nos. WO2000006652 and WO2006024639, and U.S. Patent applications Nos. US2005034252 and US2005034253.

SUMMARY OF THE INVENTION

The present invention provides a reactive red dye composition that is used for dyeing cellulose fibers and cellulose fiber blends or interwoven fabrics.

The reactive red dye composition of the present invention comprises the following component (A) and component (B).

Component (A) is 3% to 97% by weight of a reactive azo dye of the following formula (I),

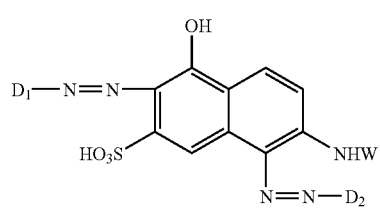

(I)

wherein W is H, —$CH_3$, —$CH_2SO_3H$, —$CH_2CH_2SO_3H$, —$CH_2COOH$ or —$CH_2CH_2COOH$;

$D_1$ and $D_2$ each independently is the following (D-a) group,

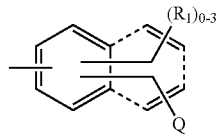

(D-a)

wherein $(R_1)_{0-3}$ each independently is 0 to 3 substituents, which can be the same or different, selected from the group consisting of: halogen, carboxyl, sulfo, —$C_{1-4}$ alkyl, and —$C_{1-4}$ alkoxyl;

Q is —NH—CO—CH(Hal)-$CH_2$(Hal), —NH—CO—C(Hal)=$CH_2$ or —$SO_2$—Y, wherein Y is —$CH_2CH_2OSO_3H$, —CH=$CH_2$ or —$CH_2CH_2U$, U is a leaving group which is eliminable by a base;

Hal is halogen.

Component (B) is 97% to 3% by weight of a reactive azo dye of the following formula (II),

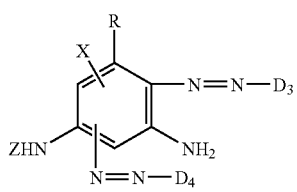

(II)

wherein R is H or carboxyl group;

X is H or

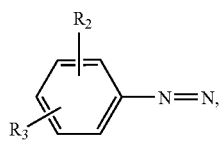

wherein $R_2$ and $R_3$ each independently is selected from the group consisting of: H, methyl, —$OCH_3$, —$OC_2H_5$, —$SO_3H$, —Cl and —$SO_2Y$, wherein Y is defined the same as the above; preferably, X is H atom;

Z is H, —$CH_2SO_3H$, —$CH_2CH_2SO_3H$, —$CH_2COOH$ or —$CH_2CH_2COOH$;

$D_3$ and $D_4$ each independently is the following (D-a) group,

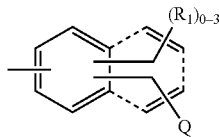

(D-a)

$(R_1)_{0-3}$ and Q are defined the same as the above-mentioned reactive azo dye of formula (I).

In the dye composition of the present invention, the $(R_1)_{0-3}$ of the formula (I) reactive azo dye is preferable 0 to 3 substituents, which can be the same or different, selected from the group consisting of: sulfo, methyl and methoxyl. The Q of the formula (I) reactive azo dye in the present invention is preferable $-SO_2-Y$, wherein Y is $-CH_2CH_2OSO_3H$, $-CH=CH_2$ or $-CH_2CH_2U$, U is a leaving group which is eliminable by a base. Preferably, the leaving group U is selected from the group consisting of: Cl, $-OSO_3H$,

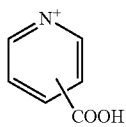

and Quaternary Ammonium Salt

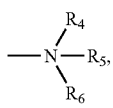

wherein
$R_4$, $R_5$, and $R_6$ each independently is $-C_{1-4}$ alkyl.

The W of the formula (I) reactive azo dye in the present invention is preferable H or $-CH_2SO_3H$.

In the reactive red dye composition of the present invention, the $D_3$ and $D_4$ of formula (II) reactive azo dye each independently is preferable the following (D-a) group,

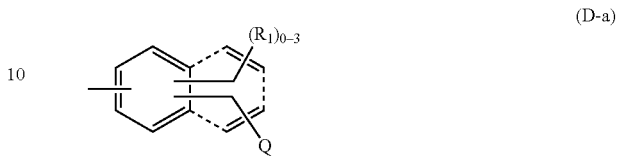

(D-a)

wherein $(R_1)_{0-3}$ are 0 to 3 substituents, which can be the same or different, selected from the group consisting of: sulfo, methyl and methoxyl;
Q is $-NH-CO-CH(Hal)-CH_2(Hal)$, $-NH-CO-C(Hal)=CH_2$ or $-SO_2-Y$, wherein Y is $-CH_2CH_2OSO_3H$, $-CH=CH_2$ or $-CH_2CH_2U$, U is a leaving group which is eliminable by a base; Hal is halogen. Preferably, Q is $-SO_2-Y$, wherein Y is $-CH_2CH_2OSO_3H$, $-CH=CH_2$ or $-CH_2CH_2U$, U is a leaving group which is eliminable by a base; Hal is halogen. Preferably, the leaving group U of the formula (II) reactive azo dye which can be eliminable by a base is selected from the group consisting of: Cl, $-OSO_3H$,

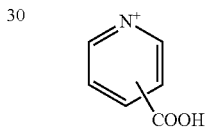

and Quaternary Ammonium Salt

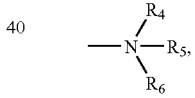

wherein $R_4$, $R_5$, and $R_6$ each independently is $-C_{1-4}$ alkyl.

The Examples of the formula (I) reactive azo dye of the present invention includes the following formulas (1), (2), (3) and (4), but the examples of the compounds are not limited thereto.

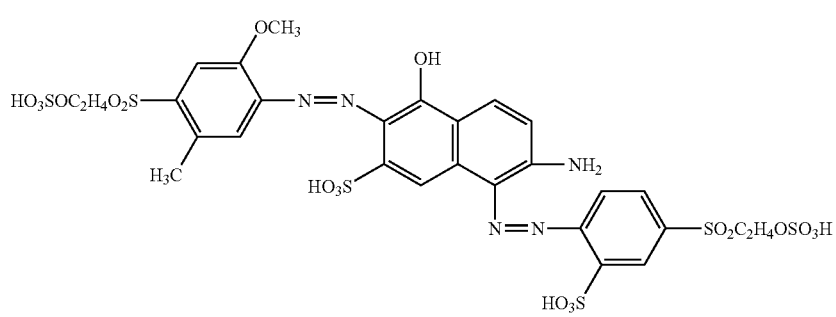

(1)

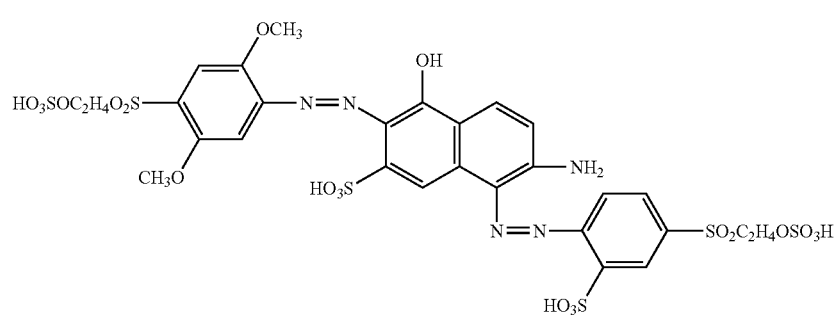
(2)
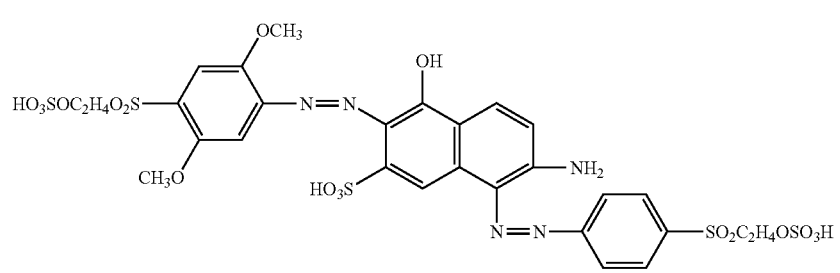
(3)
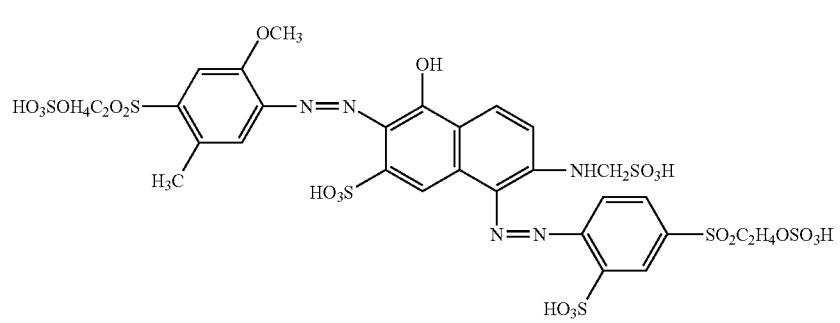
(4)
The Examples of the formula (II) reactive azo dye of the present invention includes the following formulas (5), (6), (7), (8) and (9), but the examples of the compounds are not limited thereto.
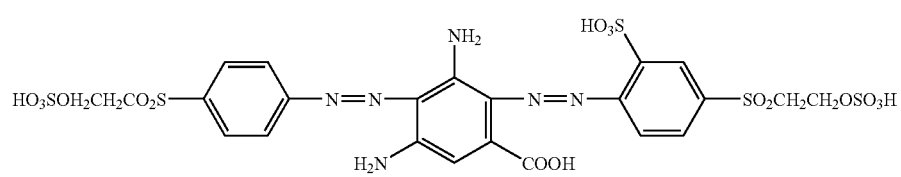
(5)
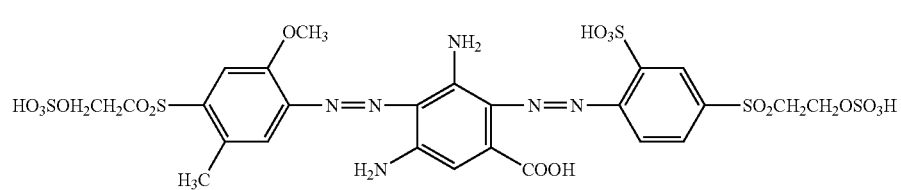
(6)

-continued

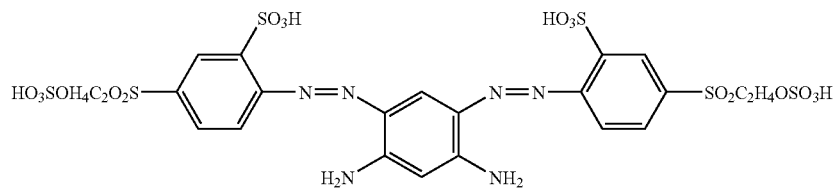
(7)

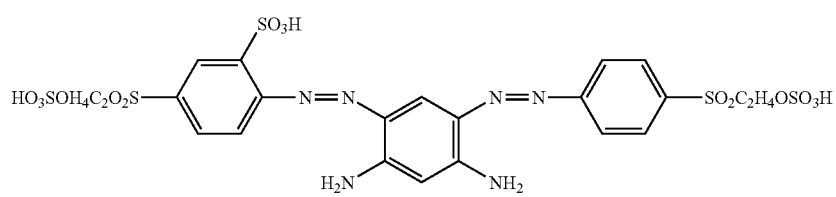
(8)

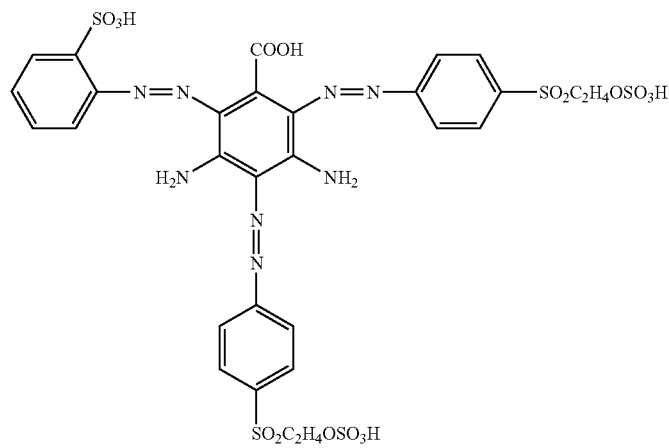
(9)

The ratio of the dye components used in the reactive red dye composition of the present invention can be varied without limitation. In general, the minimum of the relative percentage by weight is 3% and the maximum of that is 97%; preferably, the component (A) of the present invention is 60% to 90% by weight and the component (B) is 40% to 10% by weight; more preferably, the component (A) of the present invention is 70% to 90% by weight and the component (B) is 30% to 10% by weight.

The dye molecule of the present invention is presented in the forms of free acid, but it is not limited. While using in the examples, the dye molecule can be presented as a salt, such as alkaline metal salts, alkaline earth metal salts or ammonium salts, and preferably, it is sodium salt, potassium salt, lithium salt or ammonium salt.

The reactive red dye composition of the present invention is suitable for dyeing cellulose fibers such as cotton, artificial cotton, linen and artificial linen, polyamide fiber such as wool, silk and nylon, and blends or interwoven fabrics. The utilization of the dye composition of the present invention obtains various dyestuffs with good dyeing properties. For example, the dye composition of the present invention has excellent build up, wash-off and light fastness and can be applied with dyestuffs in other colors.

DETAILED DESCRIPTION OF THE PREFERRED EMBODIMENT

The formula (I) compound of the present invention can be synthesized by the following method.

Firstly, diazotizing the aromatic amine compound of the following formula (a) and proceeding a coupling reaction between the diazotized formula (a) and the aromatic amine compound of the following formula (b) under acid pH value of 1-7 and temperature of 0~30° C.

$$D_1\text{—}NH_2 \quad (a)$$

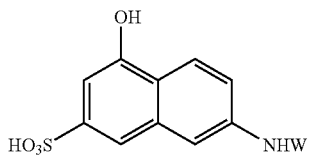
(b)

Then, further proceeding a coupling reaction with the diazonium salt of the following formula (c) under pH value between weak acid to weak alkali, such as pH value of 4.0~8.0, and temperature of 0~30° C. to obtain the formula (I) compound of the present invention, of which the W, $D_1$, and $D_2$ are defined the same as above.

$$D_2\text{-}NH_2 \quad (c)$$

The formula (II) compound of the present invention can be synthesized by the following method.

Firstly, diazotizing the amide compound of the following formula (e) and proceeding a coupling reaction between the diazotized formula (e) and the aromatic amine compound of the following formula (d) under acid pH value of 1-3 and temperature of 0~30° C.

(e)

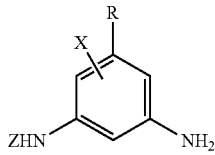
(d)

Then, further proceeding a coupling reaction with the diazonium salt of the following formula (f) under pH value between acid to neutrality, such as pH value of 3.0~7.0, and temperature of 0~30° C. to obtain the formula (II) compound of the present invention. The binding sites selected by the $D_4$—$NH_2$ will vary according to the difference of the materials and reaction conditions. In which, the R, X, Z, $D_3$ and $D_4$ are defined the same as above.

(f)

The dye composition of the present invention can be prepared in several ways. For example, the dyes can be prepared separately and then mixed together in a suitable mixer, such as a tumbler, or in a suitable mill, such as a ball mill and a sand mill. The methods described herein are all performing by stirring and mixing individual dyes to form a dye base, or by mixing individual dyes during the process of exhaust dyeing or printing.

The types of the reactive red dye composition according to the present invention are not limited, which can be powder, grain or liquid. The reactive red dye composition of the present invention can selectively comprises inorganic salts, such as sodium sulfate and sodium chloride; dispersing agents, such as β-naphthalene sulfonic acid-formaldehyde condensates, methylnaphthalene sulfonic acid-formaldehyde condensates and naphthol amide compounds; non-dusting agents, such as Bis(2-ethylhexyl)terephthalate; pH buffering agents, such as sodium acetate and sodium phosphate; water softener, such as polyphosphoester; or conventional auxiliary agents.

The reactive red dye composition of the present invention can be applied to dye cellulose fibers and blends or interwoven fabrics containing cellulose fiber materials, but not limited thereto. There are no particular limitations for the cellulose fiber materials that can be used. The cellulose fiber materials may include natural or regenerated cellulose fibers, such as cotton fibers, flax, hemp, ramie or viscose rayon.

The dyeing methods for which the present invention may apply are not limited. The examples of the dyeing methods include exhaust dyeing, continuous dyeing, cold batch-up dyeing method and printing. More preferably, the present invention may apply for discharge printing. Besides, the present invention may be used in the dye composition for inkjet ink as well.

For dyeing cellulose fibers and blends or interwoven fabrics containing cellulose fiber materials, the reactive red dye composition of the present invention has industrial merits. The reactive red dye composition has good build up, level dyeing property and dye base stability to obtain dyeing, printing or discharge printing products with high quality.

Hereinafter, the present invention will be further explained. However, it is to be understood that the examples below are only for illustrated, but not to limit the scope of the present invention. In the examples, the compound is represented in the forms of free acid, but it can be metal salts and alkaline metal salts, especially sodium salts, in the practical use. Without specific explanations, the unit of the parts and percentage used in the examples is calculated by weight and the temperature is represented by centigrade degree (° C.).

PREPARATION EXAMPLE 1

Dissolving 36.1 parts of 1-aminobenzene-2-sulfonic acid-4-β-sulfatoethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completely. Then, adding 23.9 parts of 2-amino-5-hydroxynaphthalene-7-sulfonic acid into the reaction solution and stirring the mixed reaction solution till the coupling reaction is completed. At last, adding NaCl to salt-out and filtrating the solution to obtain the following formula (I-1) compound.

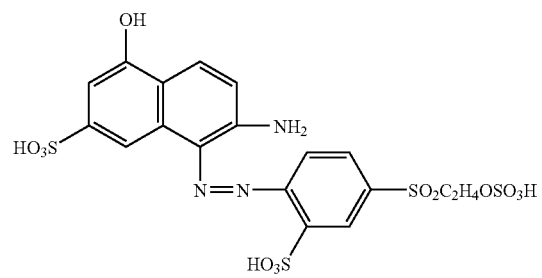
(I-1)

Dissolving 32.5 parts of 1-aminobenzene-2-methoxy-5-methyl-4-β-sulfatoethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completely. Then, adding the above formula (I-1) compound into the reaction solution, adjusting the pH value of the reaction solution to 5~6 with sodium carbonate, and stirring the mixture under the temperature of 10~15° C. till the coupling reaction is completed. At last, adding NaCl to salt-out and filtrating the solution to obtain the following formula (1) compound.

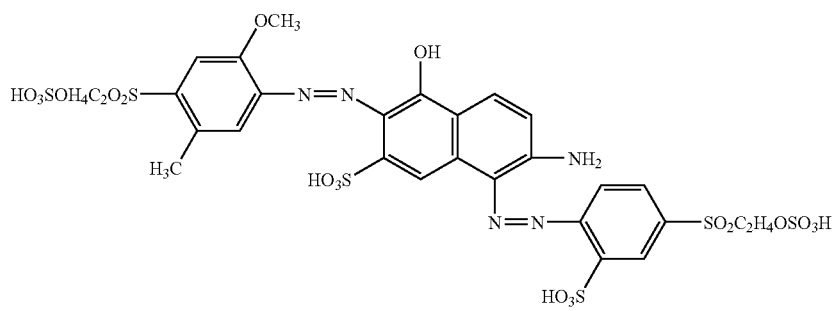

(1)

PREPARATION EXAMPLE 2

Dissolving 36.1 parts of 1-aminobenzene-2-sulfonic acid-4-β-sulfatoethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 23.9 parts of 2-amino-5-hydroxynaphthalene-7-sulfonic acid into the reaction solution and stirring the mixed reaction solution till the coupling reaction is completed. At last, adding NaCl to salt-out and filtrating the solution to obtain the following formula (I-2) compound.

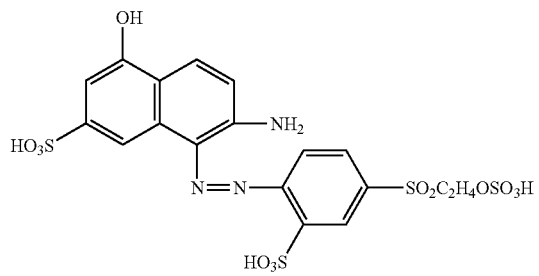

(I-2)

Dissolving 34.1 parts of 1-aminobenzene-2,5-dimethoxy-4-β-sulfatoethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completely. Then, adding the above formula (I-2) compound into the reaction solution, adjusting the pH value of the reaction solution to 5~6 with sodium carbonate, and stirring the mixture under the temperature of 10~15° C. till the coupling reaction is completed. At last, adding NaCl to salt-out and filtrating the solution to obtain the following formula (2) compound.

PREPARATION EXAMPLE 3

Dissolving 28.1 parts of 1-aminobenzene-4-β-sulfatoethylsulfone in 1000 parts of ice water, adding 24 parts of 32% HCL aqueous solution therein and stirring the solution adequately, then adding 7.0 parts of sodium nitrite aqueous solution and stirring the solution continuously under the temperature of 0~5° C. till the diazotization is completed. Then, adding 23.9 parts of 2-amino-5-hydroxynaphthalene-7-sulfonic acid into the reaction solution and stirring the mixed reaction solution till the coupling reaction is completed. At last, adding NaCl to salt-out and filtrating the solution to obtain the following formula (I-3) compound.

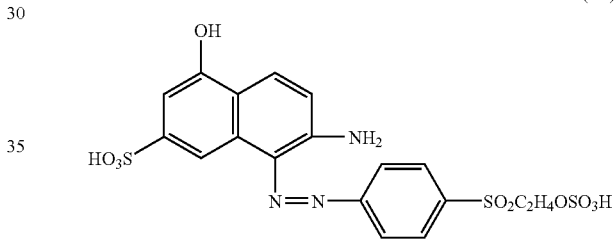

(I-3)

Dissolving 34.1 parts of 1-aminobenzene-2,5-dimethoxy-4-β-sulfato-ethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (I-3) compound into the reaction solution, adjusting the pH value of the reaction solution to 5~6 with sodium carbonate, and stirring the mixture under the temperature of 10~15° C. till the coupling reaction is completed. At last, adding NaCl to salt-out and filtrating the solution to obtain the following formula (3) compound.

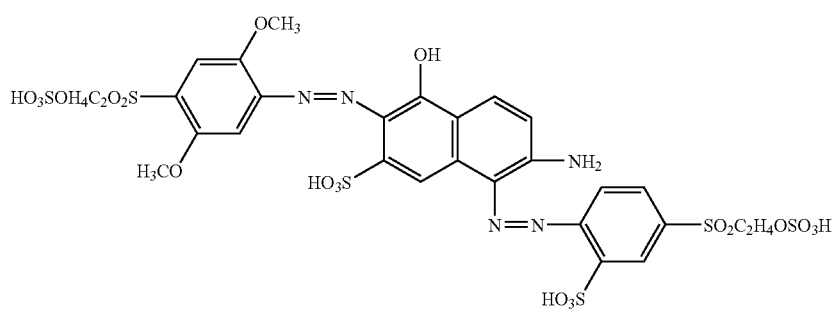

(2)

(3)

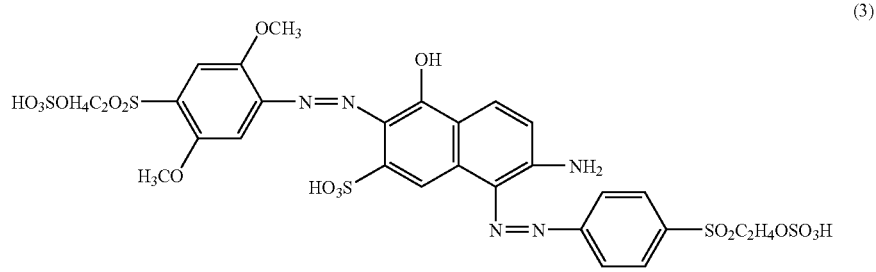

PREPARATION EXAMPLE 4

Dissolving 36.1 parts of 1-aminobenzene-2-sulfonic acid-4-β-sulfato-ethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 33.3 parts of 4-hydroxy-7-(sulfomethylamino)naphthalene-2-sulfonic acid into the reaction solution and stirring the mixed reaction solution till the coupling reaction is completed. At last, adding NaCl to salt-out and filtrating the solution to obtain the following formula (I-4) compound.

(I-4)

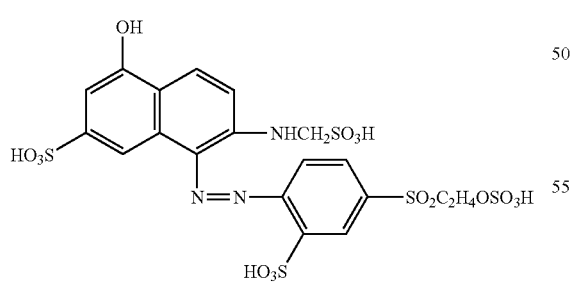

Dissolving 32.5 parts of 1-aminobenzene-2-methoxyl-5-methyl-4-β-sulfatoethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (I-4) compound into the reaction solution, adjusting the pH value of the reaction solution to 5~6 with sodium carbonate, and stirring the mixture under the temperature of 10~15° C. till the coupling reaction is completed. At last, adding NaCl to salt-out and filtrating the solution to obtain the following formula (4) compound.

(4)

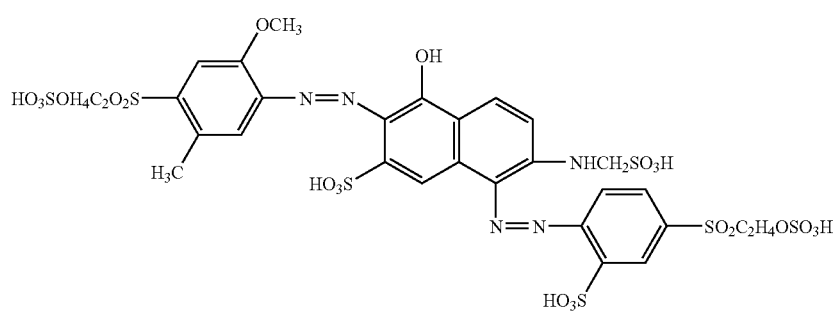

PREPARATION EXAMPLE 5

Dissolving 36.1 parts of 1-aminobenzene-2-sulfonic acid-4-β-sulfato-ethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 15.2 parts of 3,5-diaminobenzoic acid powders into the reaction solution and stirring the mixed reaction solution till the coupling reaction is completed. At last, adding NaCl to salt-out and filtrating the solution to obtain the following formula (II-1) compound.

(II-1)

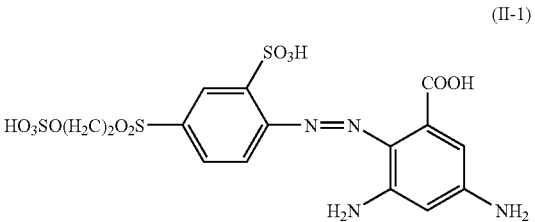

Dissolving 28.1 parts of 1-aminobenzene-4-β-sulfatoethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (II-1) compound into the reaction solution, adjusting the pH value of the reaction solution to 3.5~5.0 with sodium bicarbonate, and stirring the mixture under the temperature of 5~15° C. till the coupling reaction is completed. At last, adding NaCl to salt-out and filtrating the solution to obtain the following formula (5) compound.

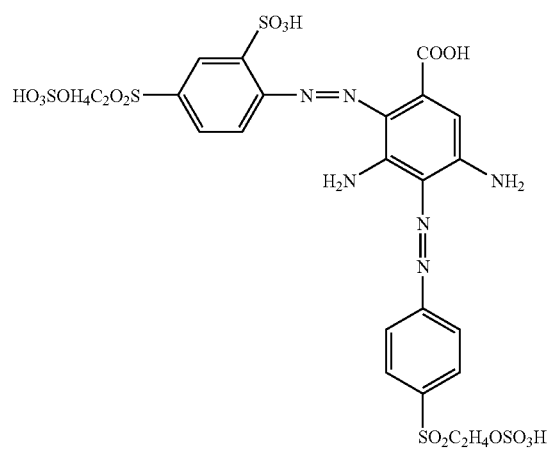

(5)

PREPARATION EXAMPLE 6

Dissolving 36.1 parts of 1-aminobenzene-2-sulfonic acid-4-β-sulfato-ethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 15.2 parts of 3,5-diaminobenzoic acid powders into the reaction solution and stirring the mixed reaction solution till the coupling reaction is completed. At last, adding NaCl to salt-out and filtrating the solution to obtain the following formula (II-2) compound.

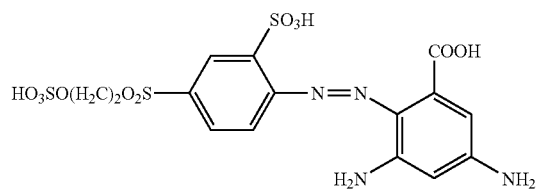

(II-2)

Dissolving 32.5 parts of 1-aminobenzene-2-methoxyl-5-methyl-4-β-sulfatoethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (II-2) compound into the reaction solution, adjusting the pH value of the reaction solution to 3.5~6.0 with sodium bicarbonate, and stirring the mixture under the temperature of 5~15° C. till the coupling reaction is completed. At last, adding NaCl to salt-out and filtrating the solution to obtain the following formula (6) compound.

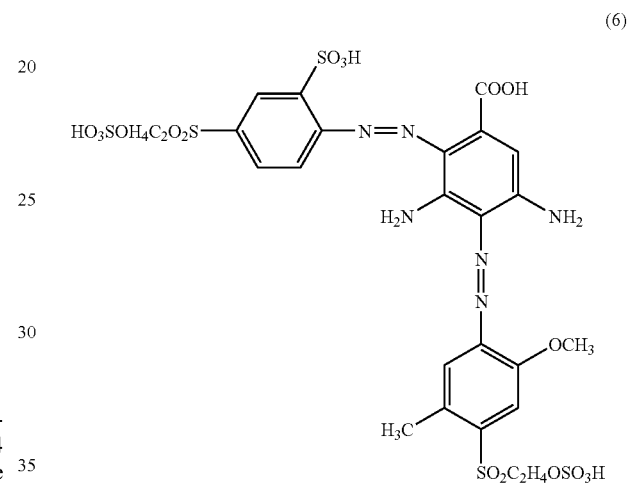

(6)

PREPARATION EXAMPLE 7

Dissolving 72.2 parts of 1-aminobenzene-2-sulfonic acid-4-β-sulfatoethylsulfone in 2000 parts of ice water, adding 48 parts of 32% HCl aqueous solution therein and stirring the solution adequately, then adding 14.0 parts of sodium nitrite aqueous solution and stirring the solution continuously under the temperature of 0~5° C. till the diazotization is completed. Then, adding 10.8 parts of m-phenylenediamine powders into the reaction solution and stirring the reaction solution for 3 hours, then adjusting the pH value of the reaction solution to 3.5~6.0 with sodium bicarbonate, and stirring the mixture under the temperature of 5~15° C. till the coupling reaction is completed. At last, adding NaCl to salt-out and filtrating the solution to obtain the following formula (7) compound.

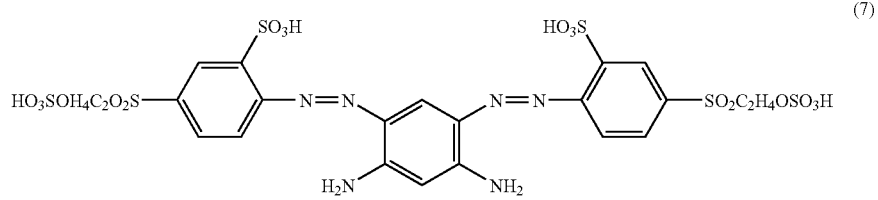

(7)

PREPARATION EXAMPLE 8

Dissolving 36.1 parts of 1-aminobenzene-2-sulfonic acid-4-β-sulfato-ethylsulfone in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 10.8 parts of phenylenediamine powders into the reaction solution and stirring the mixed reaction solution till the coupling reaction is completed to obtain the following formula (II-3) compound.

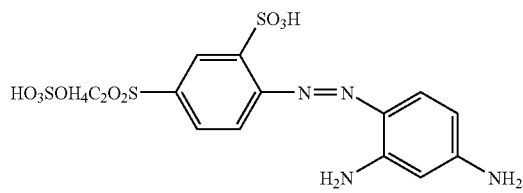

(II-3)

Dissolving 28.1 parts of 1-aminobenzene-4-β-sulfatoethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (II-3) compound into the reaction solution, adjusting the pH value of the reaction solution to 3.5~5.0 with sodium bicarbonate, and stirring the mixture under the temperature of 5~15° C. till the coupling reaction is completed. At last, adding NaCl to salt-out and filtrating the solution to obtain the following formula (8) compound.

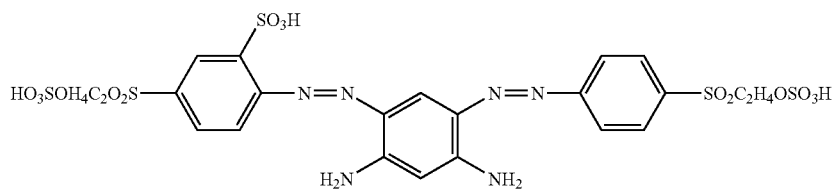

(8)

PREPARATION EXAMPLE 9

Dissolving. 17.3 parts of 1-aminobenzene-2-sulfonic acid in 1000 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 15.2 parts of 3,5-diaminobenzoic acid powders into the reaction solution and stirring the mixed reaction solution till the coupling reaction is completed. At last, adding NaCl to salt-out and filtrating the solution to obtain the following formula (II-1) compound.

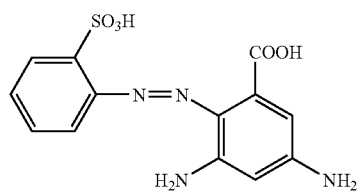

(II-1)

Dissolving 56.2 parts of 1-aminobenzene-4-β-sulfatoethylsulfone in 400 parts of ice water, adding 48 parts of 32% HCl aqueous solution therein and stirring the solution adequately, then adding 14.0 parts of sodium nitrite aqueous solution and stirring the solution continuously under the temperature of 0~5° C. till the diazotization is completely. Then, adding the above formula (II-1) compound into the reaction solution, adjusting the pH value of the reaction solution to 3.5~6.0 with sodium bicarbonate, and stirring the mixture under the temperature of 5~15° C. till the coupling reaction is completed. At last, adding NaCl to salt-out and filtrating the solution to obtain the following formula (9) compound.

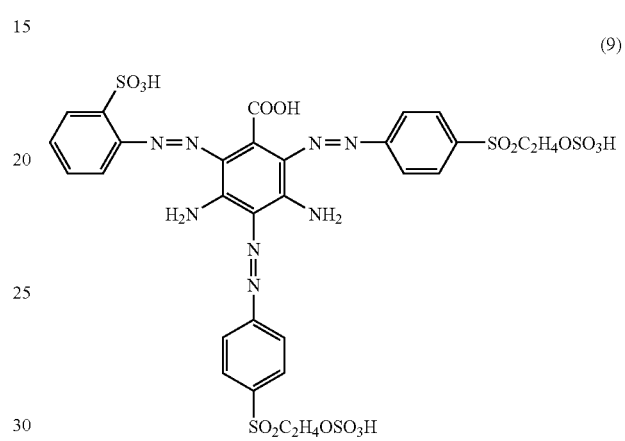

(9)

EXAMPLE 1

Mixing 85% of formula (1) compound and 15% of formula (5) compound to obtain an evenly mixed dye composition. Then, performing dyeing test by the following dyeing method to obtain a red dye product with excellent fastness.

1. Exhaust Dyeing:

Dissolving 1 part of the above well-mixed dye composition in 100 parts of distilled water to prepare a stock solution. Pouring separately 20 parts and 40 parts of the dye solution into each of two dyeing vessel which had cleaned by distilled water. Adding 4.8 parts of Glauber's Salt to each dyeing vessel and then pouring distilled water therein to make up the total amount of the dyeing solution in each dyeing vessel to be 75 parts in total. After that, 5 parts of 320 g/l soda ash are added to each dyeing vessel. Putting 4 parts of pre-wet woven cotton fabric into each dyeing solution, covering and locking the dyeing vessel, and shaking the dyeing vessel to survey the dye. Then, putting the dyeing vessel into a thermostatic bath of 62° C. and switching on the rotating knob. Raising the temperature to 60 ° C. in five minutes and then keeping the temperature for 60 minutes. After sixty minutes, taking out the dyed fabric, washing them with cold water, putting them in a steel basin, and hot washing them with boiling water for 10 minutes. Next, putting the dyed fabric in a steel basin containing 2 g/l of soaping agent and soaping off them with boiling water for ten minutes. After ten minutes, taking out the dyed fabric, washing them with cold water, and dehydrating them and drying.

2. Testing Method for Discharge Printing:

I. Preparation of Discharge Paste:
Preparing neutral discharge paste and alkaline discharge paste separately.
 A. Neutral discharge paste: 20 g of SP-DR 510 (reducing agent)+10 g of carbamide+70 g of 6% sodium alginate paste, of which the total amount is 100 g.
 B. Alkaline discharge paste: 20 g of SP-DR 510+10g of carbamide+5 g of sodium carbonate+70 g of 6% sodium alginate paste, of which the total amount is 105 g.

II. Steps of discharge Printing
 A. Exhaust dyeing
 (a) Raising the temperature of horizontal shaker to a suitable dyeing suitable temperature (60° C.);
 (b) Preparation of dye solution: taking 30 ml of 0.8% mother liquid, adding 20 ml of 240 g/l Glauber's Salt therein, and then adding water till the amount reaches 80 ml;
 (c) Putting the fabric in the prepared stock solution, shaking it evenly and then putting it into the horizontal shaker to proceed dyeing, i.e., dyeing in the horizontal shaker at 60° C.;
 (d) After maintaining the temperature at 60° C. for twenty minutes, 20 g/l of $Na_2CO_3$ (taking 5 ml from 320 g/l $Na_2CO_3$) are added therein. The temperature is still maintained at 60° C. for sixty minutes until the fabric is dyed completely. Taking the fabric out, washing it with cold water, followed by hot water of 98° C. for ten minutes, and then washing it with cold water again. After the above procedure, the fabric is put into a steel basin containing soaping agent and soaping off with hot water of 98° C. Ten minutes later, taking out the cloth, washing it with cold water, dehydrating it, and then drying.
 B. Printing the discharge paste
 (a) Placing the dyed fabric obtained from the above step (A) in a printing screen, pouring the neutral discharge paste and the alkaline discharge paste therein respectively, and then scrape printing with a magnetic steel bar.
 (b) Baking the dyed fabric that is finished by the above printing process with 80° C. and steaming it immediately after it is dried;
 (c) After steaming, washing it with cold water and warm water.
 C. Accessing the discharged fabric with the Grey Scale of the above white-discharged cloth by Spectrflash SF450, the computer color testing system, with the software of Datacolor Colortools V1.3. The smaller the color difference value and the stain degrees are obtained, the better the effect of white discharging is shown. Comparing with the discharged fabrics based on the undyed fabric, a higher whiteness degree means a better effect of white discharging.

EXAMPLE 2 TO EXAMPLE 14

Repeating the steps of Example 1, of that the components are substituted with the reactive dye composition according to the following Table 1, and repeating the dyeing and the test of discharge printing described in Example 1 to obtain various red dye products with excellent fastness. Table 1

| | Component and Percentage by weight | |
|---|---|---|
| Example | Component (A) | Component (B) |
| 2 | Formula (1) 85% | Formula (7) 15% |
| 3 | Formula (1) 80% | Formula (6) 20% |
| 4 | Formula (1) 80% | Formula (8) 20% |
| 5 | Formula (1) 80% | Formula (9) 20% |
| 6 | Formula (2) 70% | Formula (6) 30% |
| 7 | Formula (2) 70% | Formula (8) 30% |
| 8 | Formula (2) 70% | Formula (9) 30% |
| 9 | Formula (3) 80% | Formula (6) 20% |
| 10 | Formula (3) 80% | Formula (8) 20% |
| 11 | Formula (3) 80% | Formula (9) 20% |
| 12 | Formula (4) 90% | Formula (6) 10% |
| 13 | Formula (4) 90% | Formula (8) 10% |
| 14 | Formula (4) 90% | Formula (9) 10% |

REFERENCE EXAMPLE 1

Repeating the dyeing steps and the test of discharge printing of Example 1 with a reactive red dye on the market (Reactive red 195). The results of the test are shown as the following Table 2.Table 2 Test of discharge printing

| | dischargability | | | |
|---|---|---|---|---|
| | Neutral discharge | | Alkaline discharge | |
| Composition | Contamination degree | Ranking | Contamination degree | Ranking |
| Reference Example 1 | 2 | undischargeable | 2 | undischargeable |
| Example 1 | 4 | dischargeable | 4–5 | dischargeable |
| Example 2 | 4 | dischargeable | 4 | dischargeable |
| Example 3 | 4–5 | dischargeable | 4–5 | dischargeable |
| Example 4 | 4–5 | dischargeable | 4–5 | dischargeable |
| Example 5 | 4–5 | dischargeable | 4–5 | dischargeable |
| Example 6 | 4–5 | dischargeable | 4–5 | dischargeable |
| Example 7 | 4–5 | dischargeable | 4–5 | dischargeable |
| Example 8 | 4–5 | dischargeable | 4–5 | dischargeable |
| Example 9 | 4–5 | dischargeable | 4–5 | dischargeable |
| Example 10 | 4–5 | dischargeable | 4–5 | dischargeable |
| Example 11 | 4 | dischargeable | 4–5 | dischargeable |
| Example 12 | 4–5 | dischargeable | 4–5 | dischargeable |
| Example 13 | 4–5 | dischargeable | 4–5 | dischargeable |
| Example 14 | 4–5 | dischargeable | 4–5 | dischargeable |

In the conventional dyeing treatment technology, the definition of whiteness degree is basically based on the whiteness value and brightness value of the color sample measured after calibrating the UV amount by spectrophotometer, and then compares the whiteness value calculated from the parameter set by Canz-Griesser after the measurement with the real measurement value.

In other words, when applying the dyes on the cellulose fibers to proceed with white discharging, the discharge agent would break the bonding between the dyes and the cellulose fibers, which results in effect of color reduction. The higher the whiteness value of the white-discharged part of the cellulose fibers is, the better effect of the discharge printing presents. As a result, the reactive red dye composition of the present invention suitable for dyeing cellulose fibers can obtain not only good level dyeing property and good build up but also excellent effect of discharge printing. The effect of build up and white discharging are better while applying the present invention to exhaust dyeing, continuous dyeing and printing, especially to exhaust dyeing and continuous dyeing.

From the foregoing description, regardless of the objects, the techniques, the effects or the skill aspects and developments, the present invention is distinctive with respect to known skills. Although the present invention has been explained in relation to its preferred embodiment, it is to be understood that many other possible modifications are variations can be made without departing from the scope of the invention as hereinafter claimed.

What is claimed is:

1. A reactive red dye composition comprising:
   (A) 60% to 90% by weight of a reactive azo dye of the following formula (I),

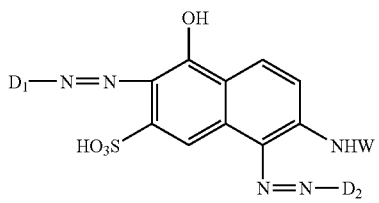

wherein
W is H, —CH$_3$, —CH$_2$SO$_3$H, —CH$_2$CH$_2$SO$_3$H, —CH$_2$COOH or —CH$_2$CH$_2$COOH;
D$_1$ and D$_2$ each independently is the following (D-a) group,

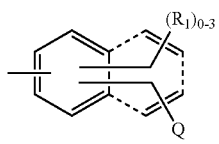

wherein (R$_1$)$_{0-3}$ each independently is 0 to 3 substituents, which can be the same or different, selected from the group consisting of: halogen, carboxyl, sulfo, —C$_{1-4}$ alkyl, and —C$_{1-4}$ alkoxyl;
Q is —NH—CO—CH(Hal)—CH$_2$(Hal), —NH—CO—C(Hal)=CH$_2$ or —SO$_2$—Y, wherein Y is —CH$_2$CH$_2$OSO$_3$H, —CH=CH$_2$ or —CH$_2$CH$_2$U, U is a leaving group which is eliminable by a base;
Hal is halogen; and
(B) 40% to 10% by weight of a reactive azo dye of the following formula (II),

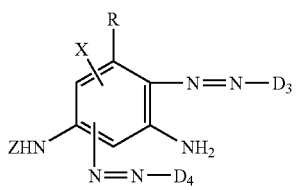

wherein R is H or carboxyl group;
X is H or

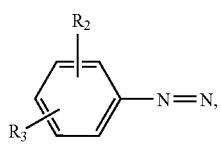

wherein R$_2$ and R$_3$ each independently is selected from the group consisting of: H, methyl, —OCH$_3$, —OC$_2$H$_5$, —SO$_3$H, —Cl and —SO$_2$Y, wherein Y is defined the same as the above;

Z is H, —CH$_2$SO$_3$H, —CH$_2$CH$_2$SO$_3$H, —CH$_2$COOH or —CH$_2$CH$_2$COOH;
D$_3$ and D$_4$ each independently is the following (D-a) group,

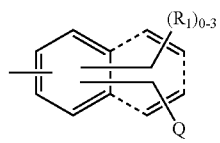

(R$_1$)$_{0-3}$ and Q are defined the same as the above.

2. The dye composition of claim 1, wherein the (R$_1$)$_{0-3}$ of the formula (I) reactive azo dye are 0 to 3 substituents, which can be the same or different, selected from the group consisting of: sulfo, methyl and methoxyl.

3. The dye composition of claim 1, wherein the Q of the formula (I) reactive azo dye is —SO$_2$—Y, wherein Y is —CH$_2$CH$_2$OSO$_3$H, —CH=CH$_2$ or —CH$_2$CH$_2$U, U is a leaving group which is eliminable by a base.

4. The dye composition of claim 3, wherein the leaving group U which can be eliminable by a base is selected from the group consisting of: Cl, —OSO$_3$H,

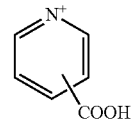

and Quaternary Ammonium Salt

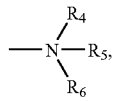

wherein R$_4$, R$_5$, and R$_6$ each independently is —C$_{1-4}$ alkyl.

5. The dye composition of claim 1, wherein the W of the formula (I) reactive azo dye is H or —CH$_2$SO$_3$H.

6. The dye composition of claim 1, wherein the X of the formula (II) reactive azo dye is H atom.

7. The dye composition of claim 1 wherein the D$_3$ and D$_4$ of the formula (II) reactive azo dye each independently is the following (D-a) group,

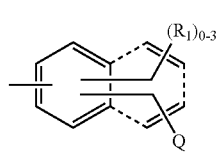

wherein (R$_1$)$_{0-3}$ is 0 to 3 substituents, which can be the same or different, selected from the group consisting of: sulfo, methyl and methoxyl; Q is —NH—CO—CH(Hal)-CH$_2$(Hal), —NH—CO—C(Hal)=CH$_2$ or —SO$_2$Y, wherein Y is —CH$_2$CH$_2$OSO$_3$H, —CH=CH$_2$ or —CH$_2$CH$_2$U, U is a leaving group which is eliminable by a base; Hal is halogen.

8. The dye composition of claim 7, wherein the Q of the formula (II) reactive azo dye is —SO$_2$—Y, wherein Y is —CH$_2$CH$_2$OSO$_3$H, —CH=CH$_2$ or —CH$_2$CH$_2$U, U is a leaving group which is eliminable by a base; Hal is halogen.

9. The dye composition of claim 8, wherein the leaving group U which can be eliminable by a base of the formula (II) reactive azo dye is selected from the group consisting of: Cl, —OSO$_3$H,

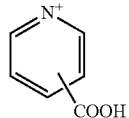

and Quaternary Ammonium Salt

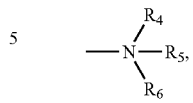

wherein R$_4$, R$_5$, and R$_6$ each independently is —C$_{1-4}$ alkyl.

10. The dye composition of claim 1, wherein the formula (I) reactive azo dye is the following formula (2),

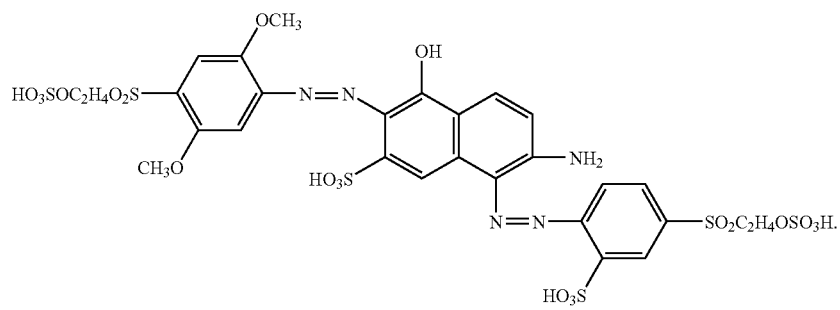

(2)

11. The dye composition of claim 1, wherein the formula (I) reactive azo dye is the following formula (3),

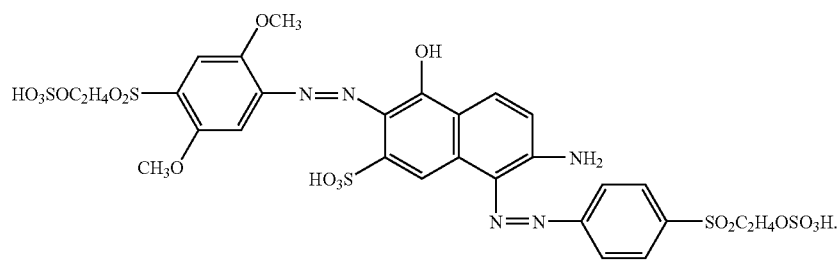

(3)

12. The dye composition of claim 1, wherein the formula (II) reactive azo dye is the following formula (5),

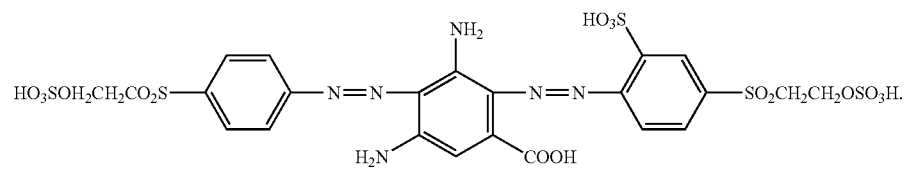

(5)

13. The dye composition of claim 1, wherein the formula (II) reactive azo dye is the following formula (6),
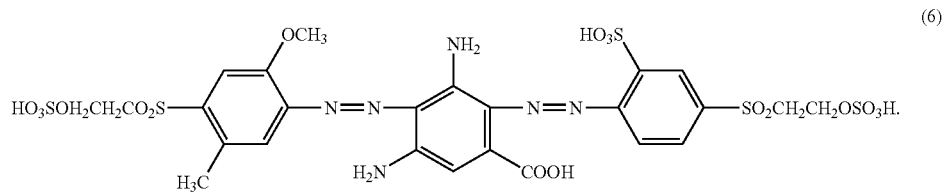
14. The dye composition of claim 1, wherein the formula (II) reactive azo dye is the following formula (9),
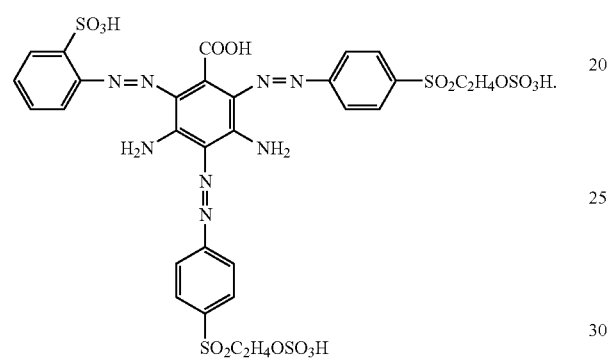
* * * * *